United States Patent
Petrisor et al.

(10) Patent No.: US 9,118,547 B2
(45) Date of Patent: Aug. 25, 2015

(54) SERIAL NETWORKING FIBER-TO-THE-SEAT INFLIGHT ENTERTAINMENT SYSTEM

(71) Applicant: Lumexis Corporation, Irvine, CA (US)

(72) Inventors: Gregory C. Petrisor, Los Angeles, CA (US); Douglas Cline, Long Beach, CA (US); Rolf Wicklund, Laguna Beach, CA (US)

(73) Assignee: Lumexis Corporation, Irvine, CA (US)

( * ) Notice: Subject to any disclaimer, the term of this patent is extended or adjusted under 35 U.S.C. 154(b) by 0 days.

(21) Appl. No.: 14/185,599

(22) Filed: Feb. 20, 2014

(65) Prior Publication Data

US 2014/0269262 A1    Sep. 18, 2014

Related U.S. Application Data

(63) Continuation of application No. 12/847,924, filed on Jul. 30, 2010, now Pat. No. 8,659,990.

(60) Provisional application No. 61/273,584, filed on Aug. 6, 2009, provisional application No. 61/274,726, filed on Aug. 20, 2009.

(51) Int. Cl.
*G01R 31/08* (2006.01)
*H04N 7/18* (2006.01)
(Continued)

(52) U.S. Cl.
CPC ...... *H04L 41/0668* (2013.01); *H04L 12/40182* (2013.01); *H04L 12/437* (2013.01);
(Continued)

(58) Field of Classification Search
CPC ............. H04N 21/41422; H04N 21/2146; B06R 11/0235; H04H 20/62; H04L 41/0668
See application file for complete search history.

(56) References Cited

U.S. PATENT DOCUMENTS 3,964,826 A    6/1976    Joseph et al.
4,337,909 A    7/1982    Harja
(Continued)

FOREIGN PATENT DOCUMENTS

CN    1048478      1/1991
CN    1362349 A    8/2002
(Continued)

OTHER PUBLICATIONS

Office Action in corresponding Chinese Application No. 2010800348715, dated Apr. 30, 2014, 33 pages.
(Continued)

*Primary Examiner* — Faruk Hamza
*Assistant Examiner* — Abu-Sayeed Haque
(74) *Attorney, Agent, or Firm* — Knobbe, Martens, Olson & Bear, LLP

(57) ABSTRACT

An entertainment system that has improved failure recovery characteristics and reduces the connection components is disclosed. In one aspect, an inflight entertainment system comprises a plurality of physically interconnected head end line replaceable units and a plurality of serially-connected networking line replaceable units physically interconnected in a serial configuration, wherein two of the serially-connected networking line replaceable units at the edge of the serial configuration are physically interconnected with two of the head end line replaceable units, respectively, wherein a loop-free head end data path is maintained between active head end line replaceable units by regulating link participation in the head end data path, and wherein one or more loop-free serially-connected networking data paths are maintained between at least one of the two head end line replaceable units and active serially-connected networking line replaceable units by regulating link participation in the serially-connected networking data paths.

22 Claims, 7 Drawing Sheets

(51) Int. Cl.
*H04L 12/24* (2006.01)
*H04L 12/40* (2006.01)
*H04L 12/437* (2006.01)
*H04N 21/214* (2011.01)
*H04L 29/08* (2006.01)

(52) U.S. Cl.
CPC ........ *H04L41/0677* (2013.01); *H04N 21/2146* (2013.01); *H04L 67/12* (2013.01); *H04L 2012/4028* (2013.01)

(56) References Cited

U.S. PATENT DOCUMENTS

| | | |
|---|---|---|
| 4,408,144 A | 10/1983 | Lukes |
| 4,433,301 A | 2/1984 | Lukes |
| 4,433,344 A | 2/1984 | Gradin et al. |
| 4,467,381 A | 8/1984 | Harjo |
| 4,577,191 A | 3/1986 | Pargee, Jr. |
| 4,639,106 A | 1/1987 | Gradin |
| 4,827,252 A | 5/1989 | Busbridge et al. |
| 4,828,378 A | 5/1989 | Ellis |
| 4,832,449 A | 5/1989 | Mundy et al. |
| 4,833,333 A | 5/1989 | Rand |
| 4,833,337 A | 5/1989 | Kelley et al. |
| 4,894,818 A | 1/1990 | Fujioka et al. |
| 4,903,017 A | 2/1990 | Wooler |
| 4,946,129 A | 8/1990 | Eastwick |
| 4,952,809 A | 8/1990 | McEwen |
| 4,958,381 A | 9/1990 | Toyoshima |
| 4,969,724 A | 11/1990 | Ellis |
| 4,993,788 A | 2/1991 | Steward |
| 4,994,794 A | 2/1991 | Price et al. |
| 5,007,699 A | 4/1991 | Stout |
| 5,014,342 A | 5/1991 | Pudsey |
| 5,056,737 A | 10/1991 | Taylor |
| 5,059,781 A | 10/1991 | Langdon |
| 5,076,524 A | 12/1991 | Reh et al. |
| 5,093,567 A | 3/1992 | Staveley |
| 5,096,271 A | 3/1992 | Portman |
| 5,121,702 A | 6/1992 | Johnson et al. |
| 5,123,728 A | 6/1992 | Gradin et al. |
| 5,132,527 A | 7/1992 | Karpati |
| 5,150,122 A | 9/1992 | Bell |
| 5,179,447 A | 1/1993 | Lain |
| 5,181,013 A | 1/1993 | Bagshaw et al. |
| 5,181,771 A | 1/1993 | Robak et al. |
| 5,184,231 A | 2/1993 | Ellis |
| 5,200,757 A | 4/1993 | Jairam |
| 5,203,220 A | 4/1993 | Lerman |
| 5,208,938 A | 5/1993 | Webb |
| 5,210,409 A | 5/1993 | Rowe |
| 5,220,456 A | 6/1993 | Haessig, Jr. |
| 5,222,780 A | 6/1993 | Reh et al. |
| 5,262,762 A | 11/1993 | Westover et al. |
| 5,267,775 A | 12/1993 | Nguyen |
| 5,289,196 A | 2/1994 | Gans et al. |
| 5,307,206 A | 4/1994 | Haessig, Jr. |
| 5,311,302 A | 5/1994 | Berry et al. |
| 5,333,002 A | 7/1994 | Gans et al. |
| 5,341,140 A | 8/1994 | Perry |
| 5,344,210 A | 9/1994 | Marwan et al. |
| 5,353,109 A | 10/1994 | Langdon et al. |
| 5,369,355 A | 11/1994 | Roe |
| 5,374,103 A | 12/1994 | Stange et al. |
| 5,398,991 A | 3/1995 | Smith et al. |
| 5,400,079 A | 3/1995 | Martinez et al. |
| 5,421,530 A | 6/1995 | Bertagna et al. |
| 5,440,337 A | 8/1995 | Henderson et al. |
| 5,442,556 A | 8/1995 | Boyes et al. |
| 5,467,106 A | 11/1995 | Salomon |
| 5,481,868 A | 1/1996 | Davies et al. |
| 5,517,508 A | 5/1996 | Scott |
| 5,523,551 A | 6/1996 | Scott |
| 5,529,265 A | 6/1996 | Sakurai |
| 5,535,884 A | 7/1996 | Scott et al. |
| 5,539,560 A | 7/1996 | Dennis et al. |
| 5,539,657 A | 7/1996 | Utsumi et al. |
| 5,543,818 A | 8/1996 | Scott |
| 5,548,356 A | 8/1996 | Portman |
| 5,568,484 A | 10/1996 | Margis |
| 5,574,497 A | 11/1996 | Henderson et al. |
| 5,577,205 A | 11/1996 | Hwang et al. |
| 5,583,674 A | 12/1996 | Mosley |
| 5,596,647 A | 1/1997 | Wakai et al. |
| 5,601,208 A | 2/1997 | Scott |
| 5,636,055 A | 6/1997 | Portman et al. |
| 5,638,236 A | 6/1997 | Scott |
| 5,640,297 A | 6/1997 | Labaze |
| 5,641,092 A | 6/1997 | Scott |
| 5,647,505 A | 7/1997 | Scott |
| 5,648,904 A | 7/1997 | Scott |
| 5,666,291 A | 9/1997 | Scott et al. |
| 5,675,752 A | 10/1997 | Scott et al. |
| 5,704,798 A | 1/1998 | Portman et al. |
| 5,705,860 A | 1/1998 | Ninh et al. |
| 5,731,782 A | 3/1998 | Walls |
| 5,738,392 A | 4/1998 | Portman |
| 5,786,801 A | 7/1998 | Ichise |
| 5,786,917 A | 7/1998 | Maeno |
| 5,790,787 A | 8/1998 | Scott et al. |
| 5,793,330 A | 8/1998 | Gans et al. |
| 5,796,185 A | 8/1998 | Takata et al. |
| 5,801,749 A | 9/1998 | Ninh et al. |
| 5,805,821 A | 9/1998 | Wang et al. |
| 5,811,791 A | 9/1998 | Portman |
| 5,812,778 A | 9/1998 | Peters et al. |
| 5,813,048 A | 9/1998 | Thom |
| 5,826,091 A | 10/1998 | Shah et al. |
| 5,831,805 A | 11/1998 | Sekine et al. |
| 5,832,279 A | 11/1998 | Rostoker et al. |
| 5,835,127 A | 11/1998 | Booth et al. |
| 5,838,802 A | 11/1998 | Swinbanks |
| 5,847,522 A | 12/1998 | Barba |
| 5,848,235 A | 12/1998 | Scott et al. |
| 5,848,367 A | 12/1998 | Lotocky et al. |
| 5,854,591 A | 12/1998 | Atkinson |
| 5,857,869 A | 1/1999 | Parcel et al. |
| 5,859,616 A | 1/1999 | Gans et al. |
| 5,871,173 A | 2/1999 | Frank et al. |
| 5,872,934 A | 2/1999 | Whitehouse et al. |
| 5,881,228 A | 3/1999 | Atkinson et al. |
| 5,884,096 A | 3/1999 | Seifert et al. |
| 5,889,466 A | 3/1999 | Ferguson |
| 5,889,775 A | 3/1999 | Sawicz et al. |
| 5,892,478 A | 4/1999 | Moss |
| 5,894,413 A | 4/1999 | Ferguson |
| 5,896,129 A | 4/1999 | Murphy et al. |
| 5,898,401 A | 4/1999 | Walls |
| 5,907,827 A | 5/1999 | Fang et al. |
| 5,910,814 A | 6/1999 | Portman et al. |
| 5,910,966 A | 6/1999 | Sekine et al. |
| 5,914,576 A | 6/1999 | Barba |
| 5,920,186 A | 7/1999 | Ninh et al. |
| 5,923,673 A | 7/1999 | Henrikson |
| 5,923,743 A | 7/1999 | Sklar |
| 5,926,759 A | 7/1999 | Severwright |
| 5,929,895 A | 7/1999 | Berry et al. |
| 5,939,997 A | 8/1999 | Sekine et al. |
| 5,942,811 A | 8/1999 | Stumfall et al. |
| 5,944,803 A | 8/1999 | Whitehouse |
| 5,945,631 A | 8/1999 | Henrikson et al. |
| 5,953,429 A | 9/1999 | Wakai et al. |
| 5,957,798 A | 9/1999 | Smith, III et al. |
| 5,963,877 A | 10/1999 | Kobayashi |
| 5,973,722 A | 10/1999 | Wakai et al. |
| 5,978,736 A | 11/1999 | Greendale |
| 5,986,810 A | 11/1999 | Webb |
| 5,991,138 A | 11/1999 | Sklar et al. |
| 5,999,520 A | 12/1999 | Little |
| 6,008,779 A | 12/1999 | Ellis |
| 6,011,322 A | 1/2000 | Stumfall et al. |
| 6,014,381 A | 1/2000 | Troxel et al. |
| 6,031,299 A | 2/2000 | Stumfall et al. |
| 6,034,688 A | 3/2000 | Greenwood et al. |

(56) References Cited

U.S. PATENT DOCUMENTS

| | | |
|---|---|---|
| 6,038,426 A | 3/2000 | Williams, Jr. |
| 6,052,426 A | 4/2000 | Maurice |
| 6,055,634 A | 4/2000 | Severwright |
| 6,057,875 A | 5/2000 | Ferguson et al. |
| 6,058,288 A * | 5/2000 | Reed et al. ............ 455/3.06 |
| 6,092,868 A | 7/2000 | Wynn |
| 6,110,261 A | 8/2000 | Guiragossian |
| 6,130,636 A | 10/2000 | Severwright |
| 6,131,119 A | 10/2000 | Fukui |
| 6,134,674 A | 10/2000 | Akasheh |
| 6,154,910 A | 12/2000 | Corney |
| 6,157,471 A | 12/2000 | Bignolles et al. |
| 6,160,591 A | 12/2000 | Stumfall et al. |
| 6,163,823 A | 12/2000 | Henrikson |
| 6,185,643 B1 | 2/2001 | Asprey et al. |
| 6,189,127 B1 | 2/2001 | Fang et al. |
| 6,195,040 B1 | 2/2001 | Arethens |
| 6,208,307 B1 | 3/2001 | Frisco et al. |
| 6,249,913 B1 | 6/2001 | Galipeau et al. |
| 6,266,736 B1 | 7/2001 | Atkinson et al. |
| 6,266,815 B1 | 7/2001 | Shen et al. |
| 6,272,572 B1 | 8/2001 | Backhaus et al. |
| 6,310,286 B1 | 10/2001 | Troxel et al. |
| 6,359,608 B1 | 3/2002 | Lebrun et al. |
| 6,366,311 B1 | 4/2002 | Monroe |
| 6,373,216 B1 | 4/2002 | Ho |
| 6,390,920 B1 | 5/2002 | Infiesto et al. |
| 6,452,155 B1 | 9/2002 | Sherlock et al. |
| 6,453,259 B1 | 9/2002 | Infiesto |
| 6,453,267 B1 | 9/2002 | Rudzik et al. |
| 6,457,837 B1 | 10/2002 | Steffensmeier |
| 6,466,258 B1 | 10/2002 | Mogenis et al. |
| 6,477,152 B1 | 11/2002 | Hiett |
| 6,490,510 B1 | 12/2002 | Choiset |
| 6,493,147 B1 | 12/2002 | Baudou et al. |
| 6,499,027 B1 | 12/2002 | Weinberger |
| 6,507,952 B1 | 1/2003 | Miller et al. |
| 6,520,015 B1 | 2/2003 | Alause et al. |
| 6,529,706 B1 | 3/2003 | Mitchell |
| 6,535,490 B1 | 3/2003 | Jain |
| D473,233 S | 4/2003 | Politzer |
| 6,549,754 B1 | 4/2003 | Miller et al. |
| 6,556,114 B1 | 4/2003 | Guillemin et al. |
| 6,559,812 B1 | 5/2003 | McCarten et al. |
| 6,561,006 B1 | 5/2003 | Roberge et al. |
| 6,588,117 B1 | 7/2003 | Martin et al. |
| 6,611,311 B1 | 8/2003 | Kretz et al. |
| 6,612,870 B1 | 9/2003 | Rauscent |
| 6,614,126 B1 | 9/2003 | Mitchell |
| 6,633,156 B1 | 10/2003 | Choisnet |
| 6,654,806 B2 | 11/2003 | Wall et al. |
| 6,661,353 B1 | 12/2003 | Gopen |
| 6,661,664 B2 | 12/2003 | Sarno et al. |
| 6,679,112 B2 | 1/2004 | Collot et al. |
| 6,681,250 B1 | 1/2004 | Thomas et al. |
| 6,698,281 B1 | 3/2004 | Choisnet |
| 6,715,150 B1 | 4/2004 | Potin |
| 6,731,639 B1 | 5/2004 | Ors et al. |
| 6,735,309 B1 | 5/2004 | Lemanski et al. |
| 6,741,841 B1 | 5/2004 | Mitchell |
| 6,754,609 B2 | 6/2004 | Lescourret |
| 6,756,304 B1 | 6/2004 | Robert |
| 6,775,462 B1 | 8/2004 | Wang et al. |
| 6,782,392 B1 | 8/2004 | Weinberger et al. |
| 6,801,769 B1 | 10/2004 | Royalty |
| 6,806,885 B1 | 10/2004 | Piper et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,811,348 B1 | 11/2004 | Meyer et al. |
| 6,812,992 B2 | 11/2004 | Nemeth |
| 6,813,777 B1 | 11/2004 | Weinberger et al. |
| 6,815,716 B2 | 11/2004 | Sanson et al. |
| 6,817,240 B2 | 11/2004 | Collot et al. |
| 6,822,812 B1 | 11/2004 | Brauer |
| 6,824,317 B2 | 11/2004 | Finizio et al. |
| D499,402 S | 12/2004 | Boyer et al. |
| 6,844,874 B2 | 1/2005 | Maurice |
| 6,845,658 B2 | 1/2005 | Roberge et al. |
| D503,707 S | 4/2005 | Boyer, Jr. |
| 6,876,905 B2 | 4/2005 | Farley et al. |
| 6,894,490 B2 | 5/2005 | Lescourret |
| 6,899,390 B2 | 5/2005 | Sanfrod et al. |
| D506,733 S | 6/2005 | Boyer, Jr. |
| 6,918,294 B1 | 7/2005 | Roberge |
| 6,919,874 B1 | 7/2005 | Maurice |
| 6,920,461 B2 | 7/2005 | Hejlsberg |
| 6,924,785 B1 | 8/2005 | Kretz et al. |
| 6,937,194 B1 | 8/2005 | Meier et al. |
| 6,938,258 B1 | 8/2005 | Weinberger et al. |
| 6,956,680 B2 | 10/2005 | Morbieu et al. |
| 6,972,747 B2 | 12/2005 | Bayot et al. |
| 6,973,479 B2 | 12/2005 | Brady, Jr. et al. |
| 6,977,638 B1 | 12/2005 | Bayot et al. |
| 7,028,304 B2 | 4/2006 | Weinberger et al. |
| 7,040,697 B1 | 5/2006 | Tuccinardi et al. |
| 7,042,528 B2 | 5/2006 | Lester et al. |
| 7,068,712 B1 | 6/2006 | Zang et al. |
| 7,076,724 B2 | 7/2006 | Cole et al. |
| 7,088,525 B2 | 8/2006 | Finizio et al. |
| 7,090,128 B2 | 8/2006 | Farley et al. |
| 7,102,691 B2 | 9/2006 | Dischert et al. |
| 7,113,978 B2 | 9/2006 | Beasley et al. |
| 7,114,171 B2 | 9/2006 | Brady et al. |
| 7,124,426 B1 | 10/2006 | Tsuria et al. |
| 7,177,638 B2 | 2/2007 | Funderburk et al. |
| 7,187,498 B2 | 3/2007 | Bengoechea et al. |
| 7,199,396 B2 | 4/2007 | Lebrun |
| 7,200,229 B2 | 4/2007 | Spring et al. |
| 7,213,055 B1 | 5/2007 | Kathol |
| 7,216,296 B1 | 5/2007 | Broberg et al. |
| 7,221,650 B1 | 5/2007 | Cooper et al. |
| 7,236,488 B1 | 6/2007 | Kavipurapu |
| 7,249,167 B1 | 7/2007 | Liaw et al. |
| 7,269,761 B2 | 9/2007 | Yi |
| 7,280,134 B1 | 10/2007 | Henderson et al. |
| 7,280,825 B2 | 10/2007 | Keen et al. |
| 7,286,289 B2 | 10/2007 | Bengoechea et al. |
| 7,289,499 B1 | 10/2007 | Chinn et al. |
| 7,330,649 B2 | 2/2008 | Finizio et al. |
| 7,337,043 B2 | 2/2008 | Bull |
| 7,343,157 B1 | 3/2008 | Mitchell |
| 7,344,102 B1 | 3/2008 | Royer et al. |
| D566,032 S | 4/2008 | Berthou et al. |
| 7,352,929 B2 | 4/2008 | Hagen et al. |
| 7,403,780 B2 | 7/2008 | VanLaningham et al. |
| 7,405,773 B2 | 7/2008 | Lester et al. |
| 7,438,511 B2 | 10/2008 | Legeay |
| 7,483,382 B1 | 1/2009 | Toillon et al. |
| 7,483,696 B1 | 1/2009 | Mitchell |
| 7,486,960 B2 | 2/2009 | Brady, Jr. et al. |
| 7,487,938 B2 | 2/2009 | Brady, Jr. et al. |
| 7,496,361 B1 | 2/2009 | Mitchell et al. |
| 7,565,143 B2 | 7/2009 | Takeuchi et al. |
| 7,566,254 B2 | 7/2009 | Sampica et al. |
| 7,580,528 B2 | 8/2009 | Farley et al. |
| 7,587,733 B2 | 9/2009 | Keen et al. |
| 7,587,734 B2 | 9/2009 | Logan et al. |
| 7,599,691 B1 | 10/2009 | Mitchell |
| 7,600,248 B1 | 10/2009 | Berry |
| 7,619,422 B2 | 11/2009 | Tsamis et al. |
| 7,620,364 B2 | 11/2009 | Higashida et al. |
| 7,621,770 B1 | 11/2009 | Finizio et al. |
| 7,628,357 B2 | 12/2009 | Mercier et al. |
| D607,800 S | 1/2010 | Canal et al. |
| D607,801 S | 1/2010 | Canal et al. |
| 7,642,974 B2 | 1/2010 | Brady, Jr. et al. |
| 7,649,696 B2 | 1/2010 | Finizio et al. |
| 7,675,849 B2 | 3/2010 | Watson et al. |
| 7,676,225 B2 | 3/2010 | Funderburk et al. |
| 7,680,092 B2 | 3/2010 | VanLaningham et al. |
| 7,715,783 B2 | 5/2010 | Girard et al. |
| 7,725,569 B2 | 5/2010 | Brady, Jr. et al. |
| 7,792,189 B2 | 9/2010 | Finizio et al. |

(56) References Cited

U.S. PATENT DOCUMENTS

| | | |
|---|---|---|
| 7,808,891 B2 | 10/2010 | Law et al. |
| 7,830,781 B2 | 11/2010 | Zogg et al. |
| 7,836,472 B2 | 11/2010 | Brady, Jr. et al. |
| 7,843,554 B2 | 11/2010 | Koenck et al. |
| 7,859,995 B2 | 12/2010 | Bejerano et al. |
| 7,876,688 B2 | 1/2011 | Hauenstein et al. |
| 8,184,974 B2 | 5/2012 | Cline |
| 8,416,698 B2 | 4/2013 | Petrisor et al. |
| 8,424,045 B2 | 4/2013 | Petrisor |
| 8,659,990 B2 | 2/2014 | Petrisor et al. |
| 9,036,487 B2 | 5/2015 | Petrisor et al. |
| 2002/0045484 A1 | 4/2002 | Eck et al. |
| 2002/0046300 A1 | 4/2002 | Hanko et al. |
| 2002/0063924 A1 | 5/2002 | Kimbrough et al. |
| 2002/0180904 A1 | 12/2002 | Lauzun et al. |
| 2003/0016806 A1 | 1/2003 | Emerson |
| 2003/0021241 A1 | 1/2003 | Dame et al. |
| 2003/0025599 A1 | 2/2003 | Monroe |
| 2003/0033459 A1 | 2/2003 | Garnett |
| 2003/0060156 A1 | 3/2003 | Giaccherini et al. |
| 2003/0064714 A1 | 4/2003 | Sanford et al. |
| 2003/0085818 A1 | 5/2003 | Renton et al. |
| 2003/0088360 A1 | 5/2003 | Ikhlef et al. |
| 2003/0093798 A1 | 5/2003 | Rogerson |
| 2003/0107248 A1 | 6/2003 | Sanford et al. |
| 2003/0110466 A1 | 6/2003 | Dricot et al. |
| 2003/0110509 A1 | 6/2003 | Levinson et al. |
| 2003/0149983 A1 | 8/2003 | Markel |
| 2003/0184957 A1 | 10/2003 | Stahl et al. |
| 2003/0217363 A1 | 11/2003 | Brady et al. |
| 2004/0052372 A1 | 3/2004 | Jakoubek |
| 2004/0081083 A1 | 4/2004 | Sekihata |
| 2004/0105459 A1 | 6/2004 | Mannam |
| 2004/0217976 A1 | 11/2004 | Sanford |
| 2004/0235469 A1 | 11/2004 | Krug |
| 2005/0005225 A1 | 1/2005 | Johnson et al. |
| 2005/0044186 A1 | 2/2005 | Petrisor |
| 2005/0044564 A1 | 2/2005 | Stopniewicz et al. |
| 2005/0053237 A1 | 3/2005 | Hanson |
| 2005/0055228 A1 | 3/2005 | Boyer et al. |
| 2005/0055278 A1 | 3/2005 | Boyer |
| 2005/0132407 A1 | 6/2005 | Boyer, Jr. et al. |
| 2005/0152289 A1 | 7/2005 | Nagata et al. |
| 2005/0177763 A1 | 8/2005 | Stoler |
| 2005/0193257 A1 | 9/2005 | Stoler |
| 2005/0200697 A1 | 9/2005 | Schedivy et al. |
| 2005/0216938 A1 | 9/2005 | Brady, Jr. et al. |
| 2005/0256616 A1 | 11/2005 | Rhoads |
| 2005/0268319 A1 | 12/2005 | Brady, Jr. et al. |
| 2005/0278753 A1 | 12/2005 | Brady, Jr. et al. |
| 2005/0278754 A1* | 12/2005 | Bleacher et al. ............ 725/77 |
| 2006/0107295 A1 | 5/2006 | Margis et al. |
| 2006/0143660 A1 | 6/2006 | Logan et al. |
| 2006/0143661 A1 | 6/2006 | Funderburk et al. |
| 2006/0143662 A1 | 6/2006 | Easterling et al. |
| 2006/0174285 A1* | 8/2006 | Brady et al. ............... 725/76 |
| 2006/0179457 A1 | 8/2006 | Brady, Jr. et al. |
| 2006/0184583 A1 | 8/2006 | Renton et al. |
| 2006/0194575 A1 | 8/2006 | Stadelmeler et al. |
| 2006/0238497 A1 | 10/2006 | Velagapudi |
| 2006/0277589 A1 | 12/2006 | Margis et al. |
| 2006/0291803 A1 | 12/2006 | Watson et al. |
| 2007/0044126 A1 | 2/2007 | Mitchell |
| 2007/0060063 A1 | 3/2007 | Wright et al. |
| 2007/0077998 A1* | 4/2007 | Petrisor ..................... 463/42 |
| 2007/0130591 A1 | 6/2007 | Brady, Jr. et al. |
| 2007/0164609 A1 | 7/2007 | Shalam et al. |
| 2007/0280199 A1 | 12/2007 | Rong |
| 2007/0292108 A1 | 12/2007 | Reichert et al. |
| 2007/0294732 A1 | 12/2007 | Brady et al. |
| 2008/0023600 A1 | 1/2008 | Perlman |
| 2008/0040756 A1 | 2/2008 | Perlman et al. |
| 2008/0050512 A1 | 2/2008 | Lower et al. |
| 2008/0056178 A1 | 3/2008 | Alexander et al. |
| 2008/0063398 A1* | 3/2008 | Cline .......................... 398/66 |
| 2008/0089658 A1 | 4/2008 | Grady et al. |
| 2008/0105784 A1 | 5/2008 | Barroca |
| 2008/0142585 A1 | 6/2008 | Foreman et al. |
| 2008/0157997 A1 | 7/2008 | Bleacher et al. |
| 2008/0159174 A1 | 7/2008 | Enomoto et al. |
| 2008/0187282 A1 | 8/2008 | Brady et al. |
| 2008/0189748 A1 | 8/2008 | Bleacher et al. |
| 2008/0237440 A1 | 10/2008 | Lester et al. |
| 2008/0240029 A1 | 10/2008 | Lynch et al. |
| 2008/0240038 A1 | 10/2008 | Lynch et al. |
| 2008/0240061 A1 | 10/2008 | Lynch et al. |
| 2008/0240062 A1 | 10/2008 | Lynch et al. |
| 2008/0244664 A1 | 10/2008 | Hong et al. |
| 2008/0259023 A1 | 10/2008 | Chang |
| 2008/0285459 A1 | 11/2008 | Diab et al. |
| 2008/0310609 A1 | 12/2008 | Brady, Jr. et al. |
| 2008/0312778 A1 | 12/2008 | Correa et al. |
| 2008/0313259 A1 | 12/2008 | Correa et al. |
| 2009/0007193 A1* | 1/2009 | Correa et al. ............... 725/76 |
| 2009/0007194 A1 | 1/2009 | Brady, Jr. et al. |
| 2009/0034540 A1 | 2/2009 | Law |
| 2009/0068474 A1 | 3/2009 | Lower et al. |
| 2009/0077595 A1 | 3/2009 | Sizelove et al. |
| 2009/0079705 A1 | 3/2009 | Sizelove et al. |
| 2009/0081947 A1 | 3/2009 | Margis |
| 2009/0083805 A1* | 3/2009 | Sizelove et al. ............. 725/76 |
| 2009/0094635 A1 | 4/2009 | Aslin et al. |
| 2009/0096857 A1 | 4/2009 | Frisco et al. |
| 2009/0100476 A1 | 4/2009 | Frisco et al. |
| 2009/0119721 A1 | 5/2009 | Perlman et al. |
| 2009/0168914 A1* | 7/2009 | Chance et al. ............. 375/267 |
| 2009/0202241 A1 | 8/2009 | Yu et al. |
| 2009/0228908 A1 | 9/2009 | Margis et al. |
| 2009/0243352 A1 | 10/2009 | Cailleteau |
| 2009/0246355 A9 | 10/2009 | Lower et al. |
| 2009/0262290 A1 | 10/2009 | Sampica et al. |
| 2009/0279257 A1 | 11/2009 | Lower et al. |
| 2009/0282469 A1 | 11/2009 | Lynch et al. |
| 2010/0008503 A1 | 1/2010 | Farley et al. |
| 2010/0013279 A1 | 1/2010 | Cailleteau |
| 2010/0027461 A1 | 2/2010 | Bothorel |
| 2010/0028019 A1 | 2/2010 | Yu et al. |
| 2010/0032999 A1 | 2/2010 | Petitpierre |
| 2010/0060739 A1 | 3/2010 | Salazar |
| 2010/0064327 A1 | 3/2010 | Lynch et al. |
| 2010/0066616 A1 | 3/2010 | Brady, Jr. et al. |
| 2010/0088731 A1 | 4/2010 | Vanyek |
| 2010/0098418 A1 | 4/2010 | Bouet et al. |
| 2010/0138581 A1 | 6/2010 | Bird et al. |
| 2010/0138582 A1 | 6/2010 | Bird et al. |
| 2010/0138879 A1 | 6/2010 | Bird et al. |
| 2010/0144267 A1 | 6/2010 | Funderburk et al. |
| 2010/0152962 A1 | 6/2010 | Bennett et al. |
| 2010/0180299 A1 | 7/2010 | Girard et al. |
| 2010/0189089 A1 | 7/2010 | Lynch et al. |
| 2010/0195634 A1 | 8/2010 | Thompson |
| 2010/0199196 A1 | 8/2010 | Thompson |
| 2010/0205333 A1 | 8/2010 | Francois et al. |
| 2011/0003505 A1 | 1/2011 | Greig et al. |
| 2011/0162015 A1 | 6/2011 | Holyoake et al. |
| 2013/0083696 A1 | 4/2013 | Petrisor et al. |
| 2014/0269262 A1* | 9/2014 | Petrisor et al. ............. 370/225 |

FOREIGN PATENT DOCUMENTS

| | | |
|---|---|---|
| EP | 1469652 | 10/2004 |
| GB | 2235800 | 5/1993 |
| JP | 5596145 | 8/2014 |
| WO | WO 90/15508 | 12/1990 |
| WO | WO 98/50848 | 11/1998 |
| WO | WO 02/061594 | 8/2002 |
| WO | WO 02/093925 | 11/2002 |
| WO | WO 03/098378 A2 | 11/2003 |
| WO | WO 2004/075486 A1 | 9/2004 |
| WO | WO 2005/004490 | 1/2005 |
| WO | WO 2006/062641 | 6/2006 |
| WO | WO 2007/035739 | 3/2007 |
| WO | WO 2008/033870 | 3/2008 |
| WO | WO 2011/017233 | 2/2011 |

(56) References Cited

FOREIGN PATENT DOCUMENTS

| WO | WO 2011/020071 | 2/2011 |
| WO | WO 2011/022708 | 2/2011 |
| WO | WO 2011/044148 | 4/2011 |

OTHER PUBLICATIONS

Office Action in corresponding Russian Application No. 2012105458, dated Sep. 2, 2014, 5 pages.
Marsh, George, "A380: Jumbo Step for In-Flight-Entertainment" Avionics Magazine, Mar. 1, 2006, http://www.aviationtoday.com/av/categories/commercial/792.html, 3 pages.
Cisco Headquarters, "Guide to ATM Technology", 1999, Cisco Systems, Inc.
Texas Instruments, "IrDA Transceiver with Encoder/Decoder", http://www.ti.com/lit/ds/slus254/slus254.pdf, 1999.
Extended Search Report in corresponding European Application No. 10806973.3, dated Feb. 22, 2013 4 pages.
Office Action in corresponding Japanese Application No. 2012-523673, dated Jan. 7, 2014, 5 pages.
International Search Report and Written Opinion in corresponding International Application No. PCT/US2010/044017, mailed Oct. 25, 2010, 11 pages.
International Preliminary Report on Patentability in corresponding International Application No. PCT/US2010/044017, issued Feb. 16, 2012, 9 pages.
Office Action in related Chinese Application No. 2010800348715, dated Mar. 12, 2015, 7 pages.

\* cited by examiner

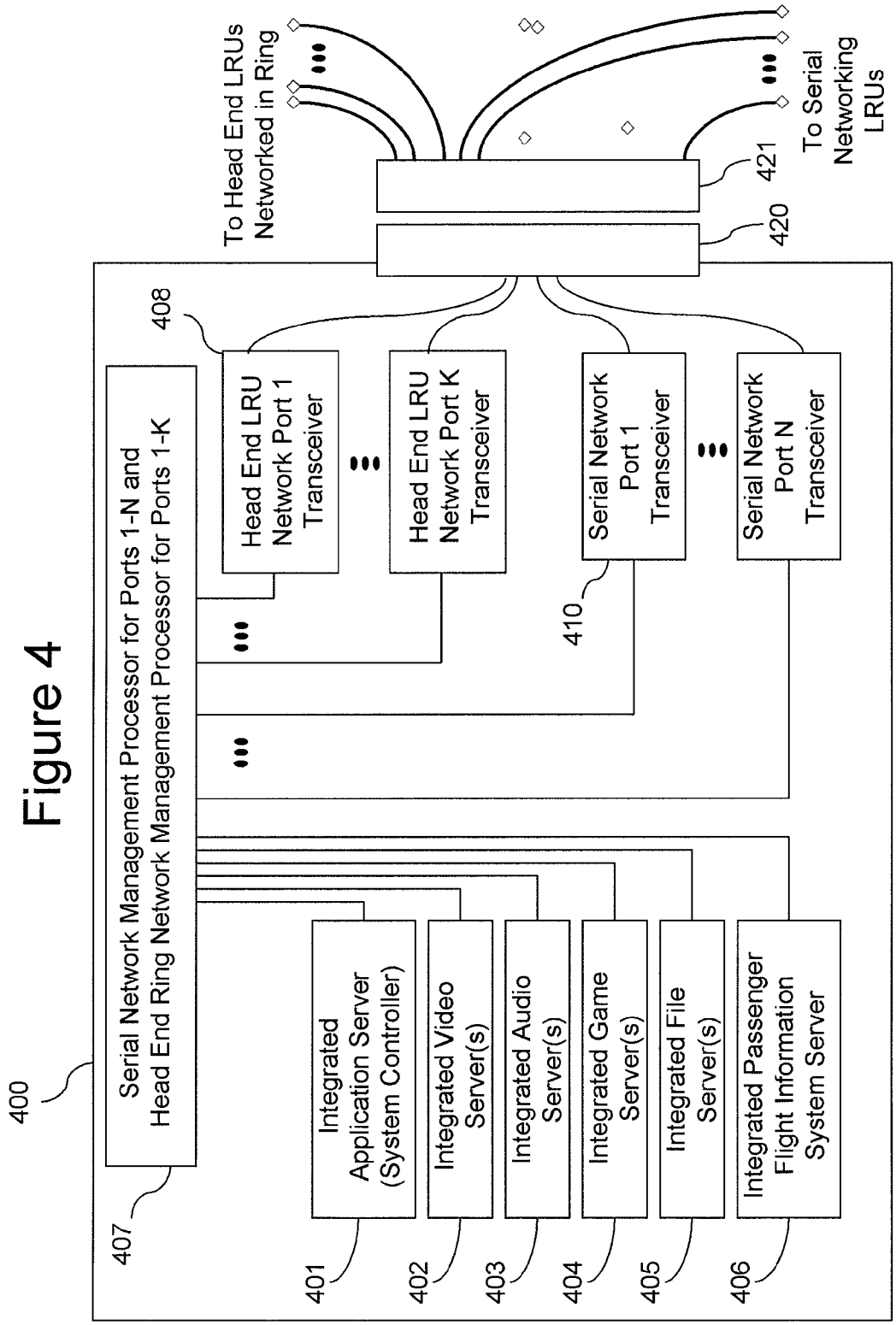

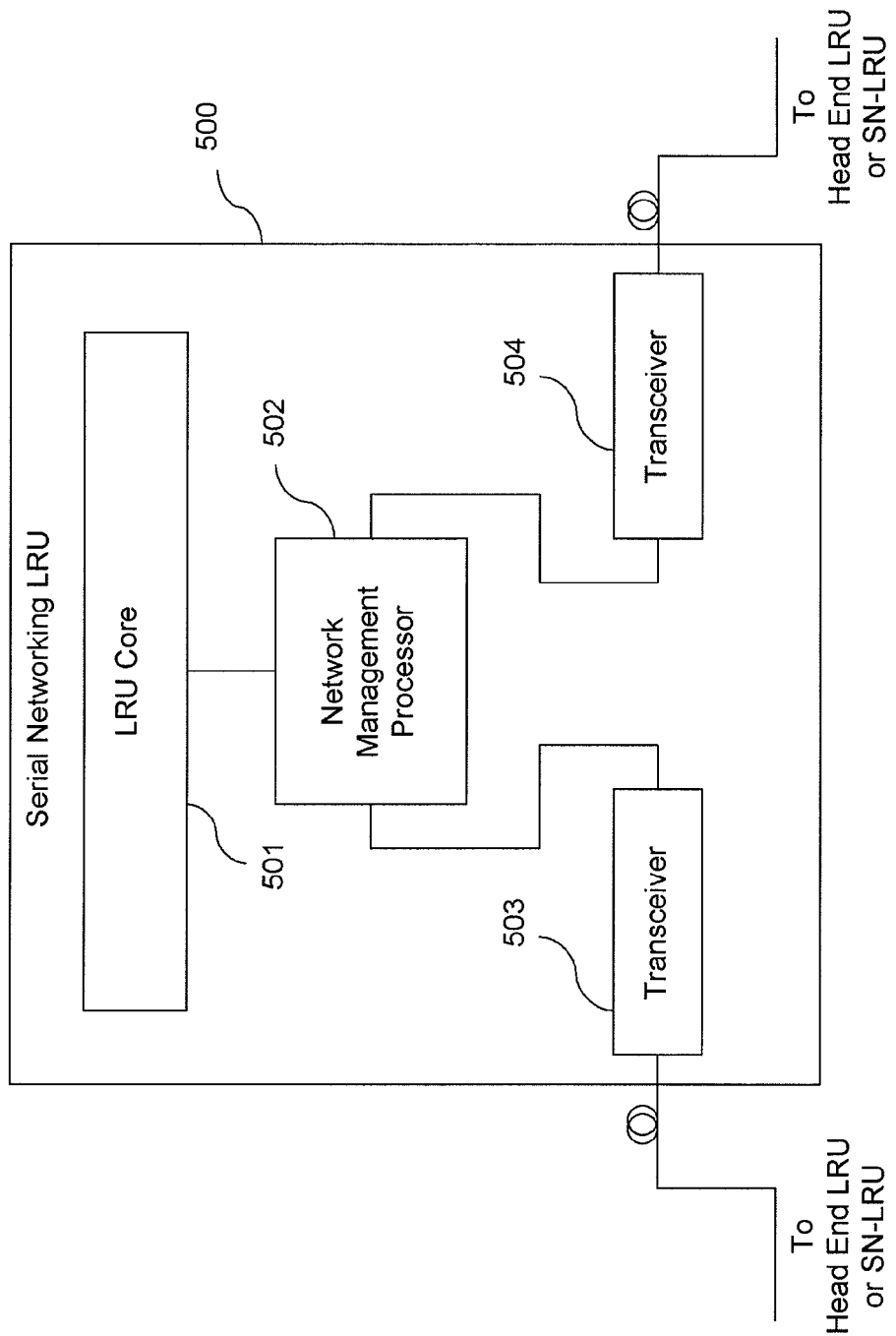

SERIAL NETWORKING FIBER-TO-THE-SEAT INFLIGHT ENTERTAINMENT SYSTEM

CROSS-REFERENCE TO RELATED APPLICATIONS

This application is a continuation of U.S. application Ser. No. 12/847,924, entitled "SERIAL NETWORKING FIBER-TO-THE-SEAT INFLIGHT ENTERTAINMENT SYSTEM," filed Jul. 30, 2010, now U.S. Pat. No. 8,659,990, which claims the benefit of U.S. provisional application No. 61/273,584, entitled "SERIAL NETWORKING FIBER-TO-THE-SEAT INFLIGHT ENTERTAINMENT SYSTEM," filed on Aug. 6, 2009, and U.S. provisional application No. 61/274,726, entitled "SERIAL NETWORKING FIBER-TO-THE-SEAT INFLIGHT ENTERTAINMENT SYSTEM NETWORK MANAGEMENT," filed on Aug. 20, 2009, the contents of all of which are incorporated herein by reference in their entirety.

BACKGROUND OF THE INVENTION

Inflight entertainment systems have evolved significantly over the last 25 years. Prior to 1978, IFE systems consisted of audio-only systems. In 1978, Bell and Howell (Avicom Division) introduced a group viewing video system based on video cassette tapes. In 1988, Airvision introduced the first in-seat video system allowing passengers to choose between several channels of broadcast video. In 1997, Swissair installed the first interactive video on demand (VOD) system. Currently, several inflight entertainment systems provide VOD with full digital video disc-like controls.

One factor in the commercial viability of an inflight entertainment system is the system's line replaceable units (LRUs). The term "LRU" is a term of art generally describing a complex component (e.g. "black box") on an airplane that is designed to be replaced quickly on the flight line or airport ramp area. LRU's are beneficial because they are generally self-contained units that can be rapidly swapped-out in the event that maintenance is required thus allowing the airplane to continue to operate with little down time. To be installed on an airplane, an LRU design must first be approved by the Federal Aviation Administration by means defined in Title 14 of the Code of Federal Regulations. LRUs of a single hardware design configuration may have different software installed. An inflight entertainment system's installation costs, operating costs, maintenance costs and passenger comfort depend greatly on the size, form factor, number and weight of its LRUs, as well as the number of distinct LRUs deployed in a single aircraft and across an airline's entire fleet of aircraft.

FIG. 1 illustrates conventional inflight entertainment systems that employ a terrestrial-like VOD architecture (i.e. head end, distribution area, seat end). The left side of the figure shows components that are typically found at the head end of the system or in an electronics bay. The right side of the figure shows system components that are typically found at the seat end. The middle section of the figure shows system components that are typically found in a distribution area between the head end and the seat end. These components include area distribution boxes (ADBs) that fan-out data from the head end to the seat end. ADBs are typically connected to seat electronics boxes (SEBs) within each seat column, which distribute data forward and/or backward to an adjacent seat group in the same seat column.

Inflight entertainment system vendors have recently made attempts to reduce the number of distinct LRUs at the seat end. Four examples of conventional seat end architectures are shown in FIG. 1. Boxes A and D show traditional seat architectures wherein SEBs are interposed between ADBs and seat end components such as VDUs and passenger control units (PCUs). Boxes B and C show newer seat architectures that reflect attempts to eliminate or reduce reliance on SEBs by moving SEB functionality to VDUs and/or PCUs. This shift has generally come at the expense of increased VDU and/or PCU size, weight and power.

The inflight entertainment industry has been slower to reduce the number of distinct LRUs at the head end and in the distribution area. Moreover, conventional inflight entertainment systems require inter-area wiring and seat-to-seat wiring that varies across inflight entertainment system vendors and even across a single inflight entertainment system vendor's products, raising installation and maintenance costs.

Some small players in the inflight entertainment industry have made advances at the head end and in the distribution area. For example, one recent inflight entertainment system has no head end or distribution area. However, this system has no parallel in terrestrial VOD systems and cannot easily leverage advancements and technology developments from the terrestrial world. Another recent inflight entertainment system has a simplified head end that integrates the audio, video and application servers in a single LRU. However, this system is proprietary and cannot easily leverage advancements in terrestrial VOD system technology. Moreover, the latter system requires a network of distribution area nodes between the head end and the seat end.

SUMMARY OF THE INVENTION

The fiber-to-the-seat (FTTS) system described in U.S. Patent Application Publication No. 2007/0077998, the contents of which are incorporated herein by reference, and summarized in FIG. 2 has offered a more modular, scalable, extensible, future proofed, wired inflight entertainment system that leverages terrestrial VOD hardware and software advances and is packaged to minimize the number of distinct LRU not only in a single aircraft but across an airline's entire fleet of aircraft (i.e. regional jets to jumbo jets). However, this FTTS system has certain drawbacks. First, each server switch unit (SSU) is a single point of failure for all VDUs and any cabin management terminal (CMT) that connects directly to that SSU. Second, the implementation of a star wired network topology wherein each VDU has a dedicated optical fiber "home run" to a head end SSU adds cost and complexity to the system. For example, over two miles of fiber are required on a typical narrow body aircraft installation and over four miles of fiber are required on a typical wide body aircraft installation. The high cost of aircraft grade fiber and fiber optic connectors, coupled with the cost and complexity of installing these fiber components, make this architecture very expensive to implement.

In some embodiments, the present invention provides an inflight entertainment system that offers advantages of the FTTS system described in U.S. Patent Application Publication No. 2007/0077998 while exhibiting superior failure recovery characteristics and having reduced fiber component requirements. The system, however, is not limited to the field of aviation; indeed other applications are contemplated, such as but not limited to buses, boats, automobiles, trains, and the like.

In one aspect of the invention, such an inflight entertainment system comprises a plurality of head end line replaceable units physically interconnected in a ring configuration and a plurality of serially-connected networking line replaceable units physically interconnected in a serial configuration, wherein two of the serially-connected networking line replaceable units at the edge of the serial configuration are physically interconnected with two of the head end line replaceable units, respectively, wherein a loop-free head end data path is maintained between active head end line replaceable units by regulating link participation in the head end data path, and wherein one or more loop-free serially-connected networking data paths are maintained between at least one of the two head end line replaceable units and active serially-connected networking line replaceable units by regulating link participation in the serially-connected networking data paths.

In some embodiments, the loop-free serially-connected networking data paths are maintained by removing a selected link from a previous serially-connected serially-connected networking data path. In some embodiments, the selected link is selected using hop count information. In some embodiments, the selected link is selected to minimize the maximum number of hops between any of the active serially-connected networking line replaceable units and either of the two head end line replaceable units.

In some embodiments, the loop-free serially-connected networking data paths are maintained by adding a selected link to a previous serially-connected networking data path in response to detecting a failure on the previous serially-connected networking data path. In some embodiments, the failure is a link failure. In some embodiments, the failure is a line replaceable unit failure.

In some embodiments, the loop-free head end data path is maintained by removing a selected link from a previous head end data path in response to detecting a loop on the previous head end data path.

In some embodiments, the loop-free head end data path is maintained by adding a selected link to a previous head end data path in response to detecting a failure on the previous head end data path. In some embodiments, the failure is a link failure. In some embodiments, the failure is a line replaceable unit failure.

In some embodiments, the plurality of serially-connected networking line replaceable units comprises at least one video display line replaceable unit.

In some embodiments, the plurality of serially-connected networking line replaceable units comprises at least one cabin management terminal line replaceable unit.

In some embodiments, the plurality of serially-connected networking line replaceable units comprises at least one on board network interface line replaceable unit. In some embodiments the on board network interface line replaceable unit provides connectivity to a public address system. In some embodiments the on board network interface line replaceable unit provides connectivity to a flight management system.

In some embodiments, the plurality of serially-connected networking line replaceable units comprises at least one off board network interface line replaceable unit.

In some embodiments, the plurality of serially-connected networking line replaceable units comprises at least one data loader line replaceable unit.

In some embodiments, the plurality of head end line replaceable units comprises at least one application server.

In some embodiments, the plurality of head end line replaceable units comprises at least one audio server.

In some embodiments, the plurality of head end line replaceable units comprises at least one video server.

In some embodiments, the plurality of head end line replaceable units comprises at least one file server.

In some embodiments, the plurality of head end line replaceable units comprises at least one game server.

In some embodiments, the plurality of head end line replaceable units comprises at least one passenger flight information system server.

In another aspect of the invention, a first head end line replaceable unit for an inflight entertainment system comprises a plurality of fiber optic transceivers and a processor communicatively coupled with the transceivers, wherein under control of the processor in response to failure of a first link to a second head end line replaceable unit via a first one of the transceivers the first head end line replaceable unit activates a second link to a third head end line replaceable unit via a second one of the transceivers whereby a loop-free head end data path between a plurality of head end line replaceable units is restored.

In another aspect of the invention, a serial networking line replaceable unit for an inflight entertainment system comprises a plurality of fiber optic transceivers and a processor communicatively coupled with the transceivers, wherein under control of the processor in response to failure of a first data path to a first head end line replaceable unit via a first one of the transceivers the serial networking line replaceable unit activates a second data path to a second head end line replaceable unit via a second one of the transceivers.

In another aspect of the invention, a head end line replaceable unit for an inflight entertainment system comprises a plurality of fiber optic transceivers and a processor communicatively coupled with the transceivers, wherein under control of the processor the head end line replaceable unit transmits a presence message on a link via a first one of the transceivers, receives the presence message on a link via a second one of the transceivers, and in response to receiving the presence message removes one of the links from participation in a loop-free head end data path between a plurality of head end line replaceable units.

In some embodiments, under control of the processor the head end line replaceable unit transmits to a serial networking line replaceable unit via a third one of the transceivers a second presence message having a hop count.

In yet another aspect of the invention, a serial networking line replaceable unit for an inflight entertainment system comprises a plurality of fiber optic transceivers and a processor communicatively coupled with the transceivers, wherein under control of the processor the serial networking line replaceable unit receives a presence message having a received hop count on a link via a first one of the transceivers, increments the hop count and transmits the presence message having an incremented hop count on a link via a second one of the fiber optic transceivers, and wherein under control of the processor the serial networking line replaceable unit regulates participation of one of the links in a loop-free serial networking data path between a head end line replaceable unit and a plurality of serial networking line replaceable units based at least in part on the received hop count.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 4 shows a head end line replaceable unit for an inflight entertainment system with serial networking line replaceable unit chains and a head end line replaceable unit ring in accordance with some embodiments of the invention.

FIG. 5 shows a generic serial networking line replaceable unit for an inflight entertainment system with serial networking line replaceable unit chains and a head end line replaceable unit ring in accordance with some embodiments of the invention.

DETAILED DESCRIPTION OF PREFERRED EMBODIMENTS

Figure 1:
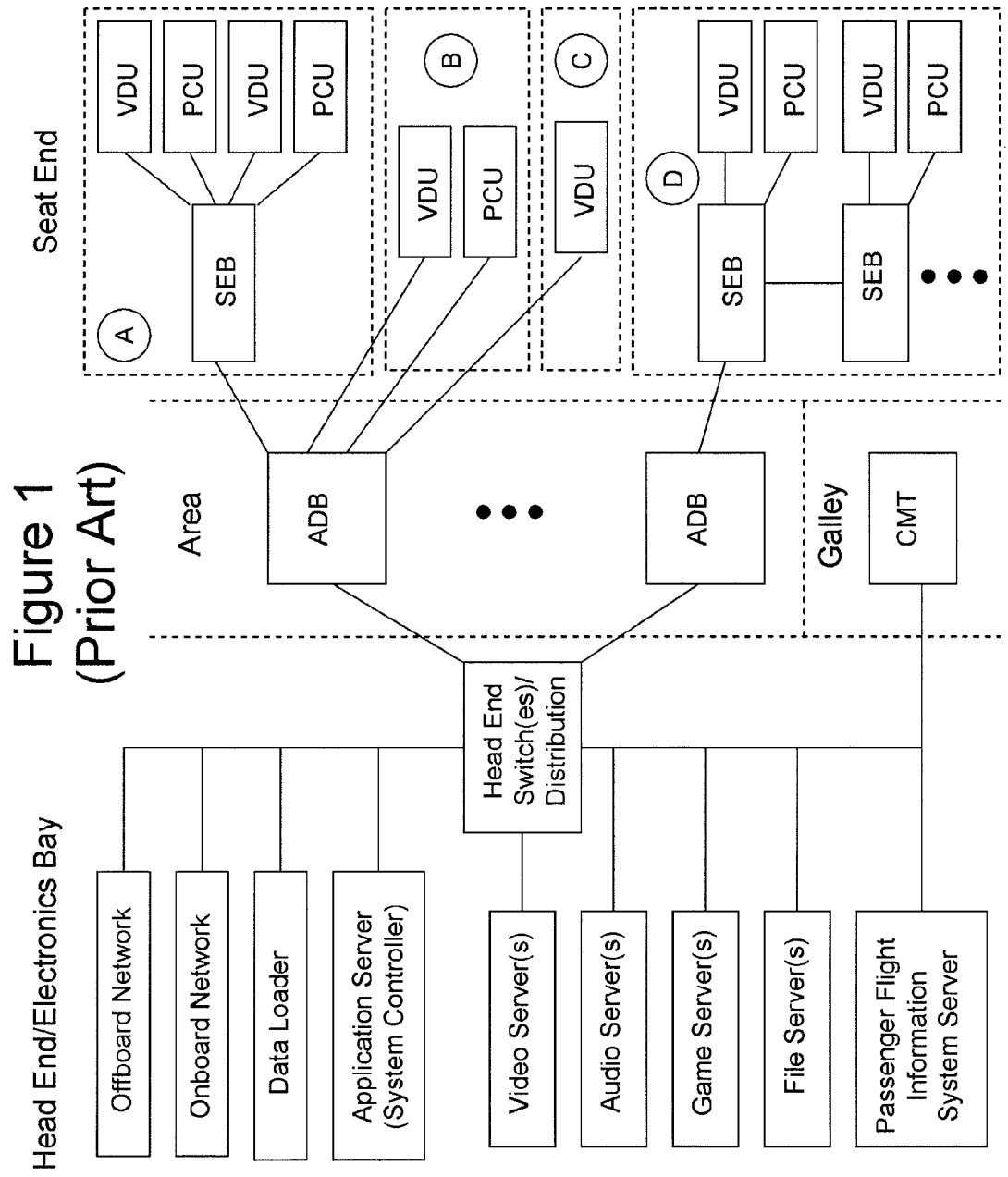
FIG. 1 shows known inflight entertainment systems.
Figure 2:
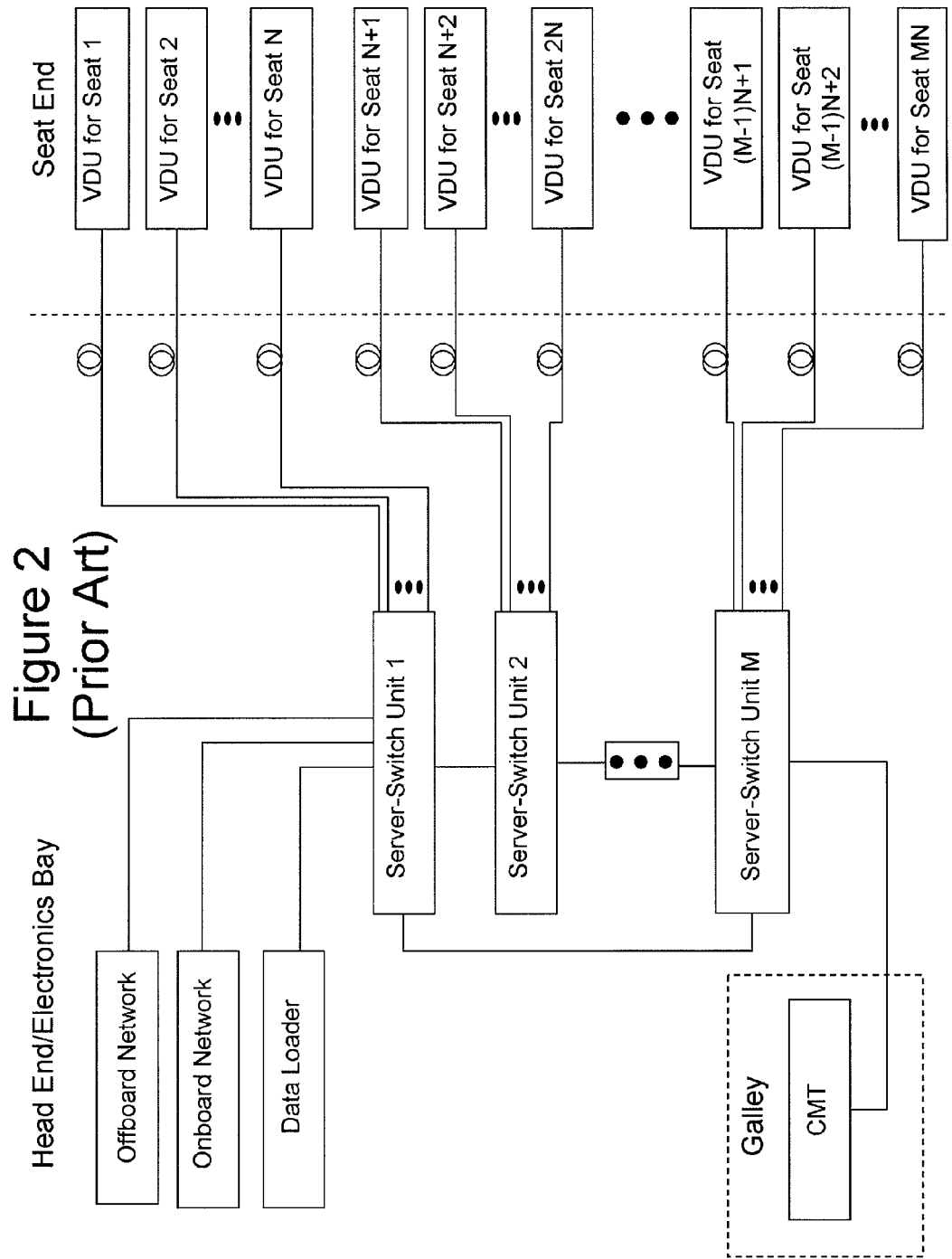
FIG. 2 shows a known FTTS inflight entertainment system.
Figure 3:
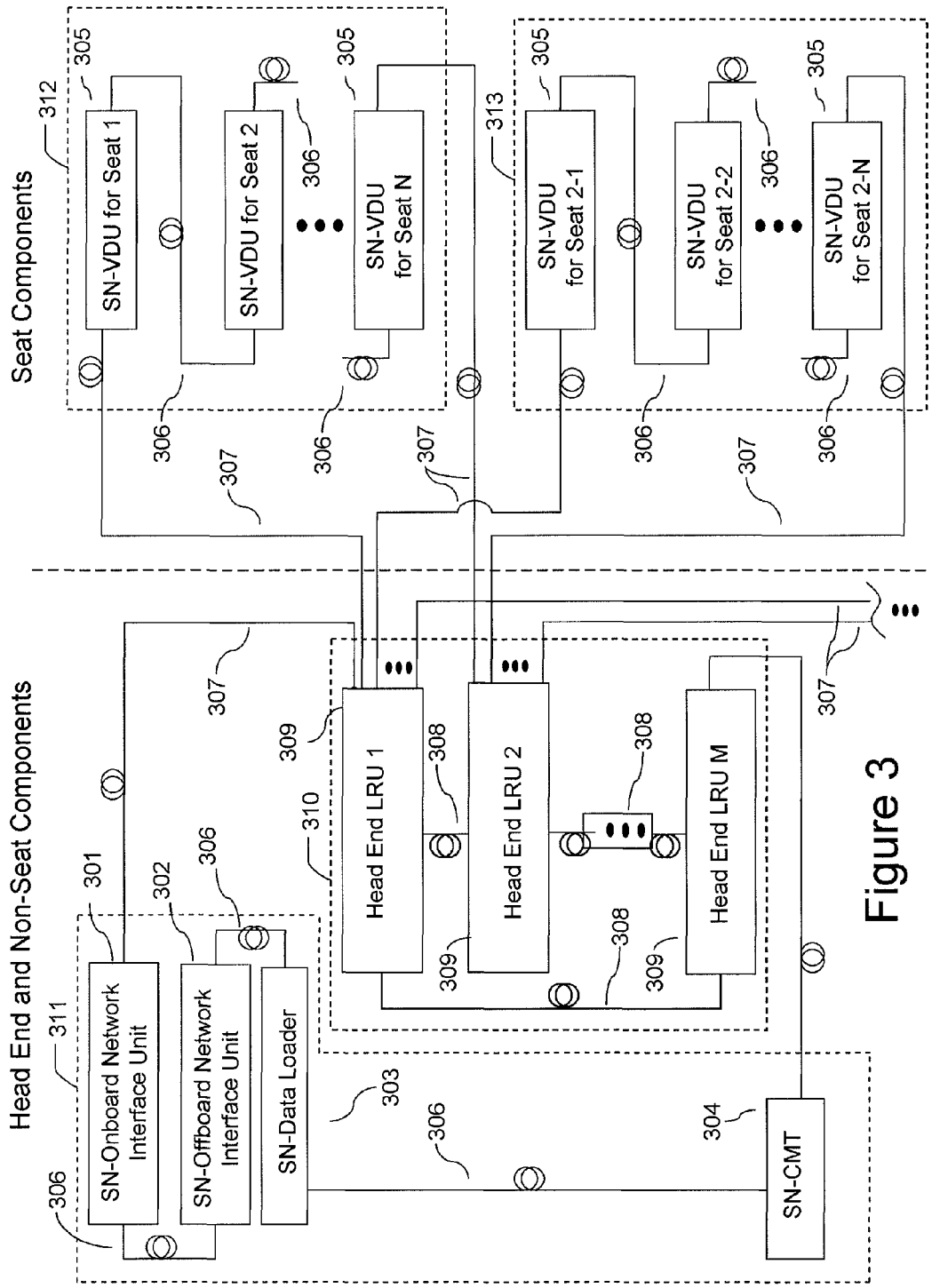
FIG. 3 shows an inflight entertainment system with serially-connected networking line replaceable unit chains and a head end line replaceable unit ring in accordance with some embodiments of the invention.

FIG. 3 shows an inflight entertainment (IFE) system with serial networking line replaceable unit (SN-LRU) chains 311-313 and a head end line replaceable unit (HE-LRU) ring 310 in some embodiments of the invention. As illustrated, SN-LRU chain 311 and HE-LRU ring 310 are positioned outside of the seats, while SN-LRU chains 312, 313 are positioned at the seats. In these embodiments, multiple HE-LRUs 309 are physically connected by ring via fiber optic links 308. Multiple chains of SN-LRUs 301-305 are physically connected to HE-LRUs 309 at their edges (ends) via links 307, for example fiber optics, such that the two edges of each chain are physically connected to a different one of HE-LRUs 309. Many types of SN-LRUs can be employed, for example serial networking onboard network interface unit 301, serial networking offboard network interface unit 302, serial networking data loader 303, serial networking CMT 304 (generally positioned in the galley), and serial networking VDUs 305.

Each SN-LRU 301-305 discovers through topology messaging the nearest HE-LRU 309. In the illustrated embodiment, starting on one SN-LRU chain 311 edge, unit 301 is connected to one of HE-LRUs 309 via a link 307 in the upstream direction while connecting to unit 302 in the downstream direction via another link 306. Unit 301 receives from the HE-LRU 309 in the upstream direction a presence message including a hop count to the HE-LRU 309, increments the hop count, and passes the updated presence message along in the downstream direction to unit 302. As the presence message progresses in the downstream direction, each successive SN-LRU in the chain (e.g. 302, 303, 304) increments the hop count. Continuing on this chain, unit 302 is connected in the downstream direction to data loader 303 over another link 306. Data loader 303 is connected in the downstream direction to CMT 304 over another link 306. In the final link of this SN-LRU chain 311, CMT 304 at the edge of the chain is connected back to a different one of HE-LRUs 309 over yet another link 307. In the other direction, CMT 304 receives from that HE-LRU 309 a presence message including a hop count, increments the hop count, and passes the updated presence message along in the upstream direction to data loader 303. Each successive SN-LRU in the chain 311 increments the hop count accordingly.

The IFE system can include at least one additional SN-LRU chain 312 and probably at least two additional SN-LRU chains 312, 313. The additional SN-LRU chain or chains 312, 313 can consist of most any type of SN-LRU, such as VDUs 305. On each edge of these additional SN-LRU chains 312, 313, one of serial networking VDUs 305 is connected to one of HE-LRUs 309 over a link and within each of these SN-LRU chains serial networking VDUs 305 are connected over links. These additional SN-LRU chains 312, 313 generally disseminate presence messages and hop count information in the same manner as the previously described SN-LRU chain 311.

Separately, each HE-LRU discovers through topology messaging whether the HE-LRU ring 310 is closed or open. Each HE-LRU 309 receives a presence message from neighboring HE-LRUs 309 and relays the presence message on its non-ingress port until it is determined whether presence message loops-back to the originating HE-LRUs 309, in which case it is revealed that the HE-LRU ring 310 is closed, or does not loop-back to the originating HE-LRUs 309, in which case it is revealed that the HE-LRU ring 310 is open.

Server functionality (e.g. application server, audio server, video server, game server, file server, passenger information system server) is integrated into HE-LRUs 309 in a modular, scalable, robust fashion that minimizes the impact on the IFE system in the event one or more of HE-LRUs 309 fails. Network management processors within HE-LRUs 309 and SN-LRUs restore network access of live SN-LRUs 301-305 to HE-LRUs 309 under the following scenarios: (a) a connection break along an SN-LRU chain 311-313; (b) failure of an SN-LRU 301-305 in an SN-LRU chain 311-313; (c) failure of an HE-LRU 309 at one end of an SN-LRU chain 311-313. Moreover, network management processors within HE-LRUs 309 restore network access of SN-LRUs 301-305 as described with respect to FIGS. 6A-7D to live HE-LRUs 309 under the following scenarios: (a) a connection break between any two HE-LRUs 309; (b) failure of an HE-LRU 309. While the number of SN-LRUs 301-305 in an SN-LRU chain 311-313 will vary, relatively short SN-LRU chains generally offer a higher level of redundancy and failover bandwidth to SN-LRUs. In some embodiments, error indications are provided, e.g. error codes, to facilitate identification, diagnosis, and/or location of the error. In some embodiments the error indications are transmitted to offboard monitoring and/or maintenance systems.

FIG. 4 shows a representative HE-LRU 400 adapted for use in an IFE system with SN-LRU chains and an HE-LRU ring in some embodiments of the invention. In these embodiments, HE-LRU 400 has integrated servers of six different types, including one or more application servers 401, video servers 402, audio servers 403, game servers 404, file servers 405 and passenger flight information system servers 406, all of which are connected to an integrated network management processor 407 over internal connections. By way of example, network management processor 407 may be a managed switch.

Application servers 401 are system controllers that provide the following types of services: content management; channel packaging; transaction processing; billing system integration; services management; provisioning integration; system administration and management; encryption management (key servers, authentication etc.); software client management; server integration for audio, video, gaming and file servers or the like. Video servers 402 provide the following types of services: VOD, near VOD; pay per view; network personal video recorder; broadcast video or the like. Audio servers 403 provide the following types of services: audio on demand; broadcast audio or the like. Game servers 404 provide the following types of services: logic and programming for games; dynamically delivered web pages for browser based games or the like. File servers 405 provide the following types of services: cached Internet content; cached user data and user profile data or the like. Passenger flight information system servers 406 use inputs from the aircraft navigation system and compute various flight information including time to destination, speed, altitude, outside air temperature, time at destination, aircraft location for display to passenger either in text form or graphically such as a moving map display or the like.

Processor 407 has N ports reserved for physical connections to SN-LRUs on the edges of chains and K ports reserved for physical connections to other HE-LRUs in a ring. The K ports reserved for HE-LRU ring connections are connected to K HE-LRU port transceivers 408 over internal connections. Port transceivers 408 are in turn connected to a fiber optic panel connector 420 over K internal fiber optic connections. Similarly, the N ports reserved for SN-LRU chain connections are connected to N SN-LRU port transceivers 410 over internal connections. Port transceivers 410 are in turn connected to panel connector 420 over N internal fiber optic connections. In some embodiments, the internal fiber optic connections are simplex by the time they connect to panel connector 420 (e.g. port transceivers 408 and 410 are bidirectional or a coupler is used to convert a unidirectional duplex transceiver output to bidirectional simplex format). Panel connector 420 blind mates with a connector 421 when HE-LRU 400 is installed in a rack at the head end. Connector 421 has K external fiber optic cables reserved for HE-LRU ports that connect to the corresponding HE-LRU internal fiber optic connections when HE-LRU 400 is installed in the rack. Similarly, connector 421 has N external fiber optic cables reserved for the SN-LRU chain ports that connect to the corresponding SN-LRU internal fiber optic connections when HE-LRU 400 is installed in the rack. K and N are each greater than one. Moreover, HE-LRU 400 has T data ports, where K+N is less than or equal to T. Under control of processor 407, HE-LRU 400 provides presence information to any SN-LRU that is connected directly to HE-LRU 400 over one of the N external fiber optic cables reserved for SN-LRU chain ports (i.e. any edge SN-LRU). Under control of processor 407, HE-LRU 400 also provides its own presence information to any HE-LRU that is connected directly to HE-LRU 400 over one of the K external fiber optic cables reserved for HE-LRU ports and relays on its non-ingress port any presence information (that HE-LRU did not originate) received on these ports from neighboring HE-LRUs.

FIG. 5 shows a generic SN-LRU 500 adapted for use in an IFE system with SN-LRU chains and an HE-LRU ring in some embodiments of the invention. In these embodiments, SN-LRU 500 includes an LRU core 501 having hardware and software elements, a first fiber optic transceiver 503, a second fiber optic transceiver 504 and a network management processor 502, which may be a managed switch. Processor 502 is communicatively coupled with first transceiver 503 and second transceiver 504 via internal copper connections. Processor 502 is communicatively coupled with LRU core 501 via an internal connection, such as a copper connection. First transceiver 503 is physically connected via, for example, an external fiber optic link to an upstream HE-LRU or SN-LRU. Second transceiver 504 is similarly physically connected via an external fiber optic link to a downstream HE-LRU or SN-LRU. Processor 502 provides LRU core 501 network access to an upstream HE-LRU through first transceiver 503 or to a downstream HE-LRU through second transceiver 504. The upstream and downstream directions have been arbitrarily assigned to the network path on the left and the right of the LRU respectively.

The structure and function of LRU core 501 varies by SN-LRU type. An LRU core for on board network interface unit 301 enables access to public address audio and data for passenger convenience features such as reading light control, flight attendant call and flight information for applications such as moving maps, etc. An LRU core for off board network interface unit 302 enables communication with terrestrial networks generally through satellite- or ground-based radio frequency networks. This LRU core may enable bidirectional or unidirectional communication depending on implementation. Bidirectional versions enable connectivity with terrestrial networks (broadband connectivity). Unidirectional versions enable access to off aircraft broadcast data sources such as television (broadcast video). An LRU core for data loader 303 enables media content updates (movies, audio, games, Internet web pages, files, etc.), key updates and transaction data transfers. This LRU core enables data transfer using one of the following mechanisms: removable disk or tape inserted into data loader 303, portable disk drive or tape drive carried on board and temporarily connected to the IFE system, wireless LAN, or other wireless link. An LRU core for CMT 304 enables flight attendants to perform system management and administration functions such as: LRU reboot, video channel preview, flight attendant override, attendant call status, reading light status, built in test, interrogation and system test. LRU cores for VDUs 305 each include a physical display device (e.g. flat panel display) that enables a passenger to view video content and navigate an IFE menu. These LRU cores may additionally provide PCU functionality, such as volume control, channel control, lighting control, attendant call button, menu buttons and/or menu selection buttons, via a display device touch screen or mechanically actuated buttons. LRU cores for display interface units (not shown) include a physical interface to an external display device (e.g. flat panel display) that enables a passenger to view video content and navigate an IFE menu. Like the LRU cores for VDUs, these LRU cores may additionally provide PCU functionality, such as volume control, channel control, lighting control, attendant call button, menu buttons and/or menu selection buttons, via a display device touch screen or mechanically actuated buttons.

Figure 6B:
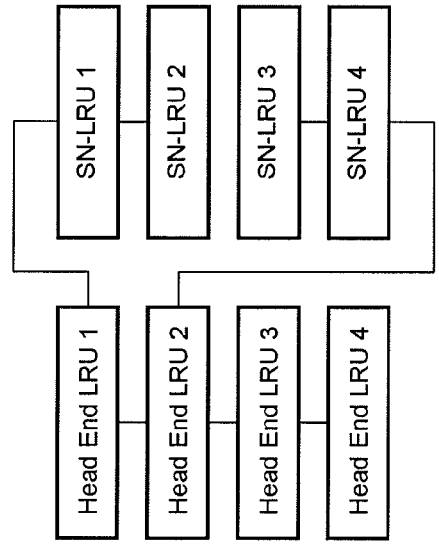
FIGS. 6A through 6D show serial networking data path maintenance in accordance with some embodiments of the invention.
Figure 6D:
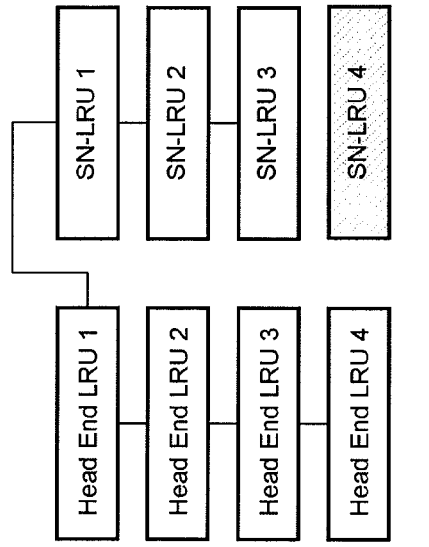
Figure 6A:
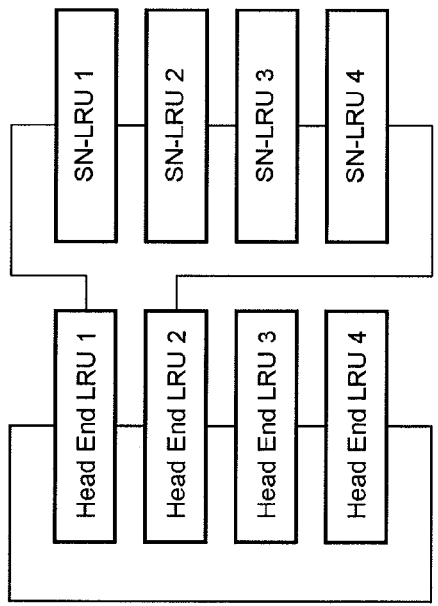
Figure 6C:
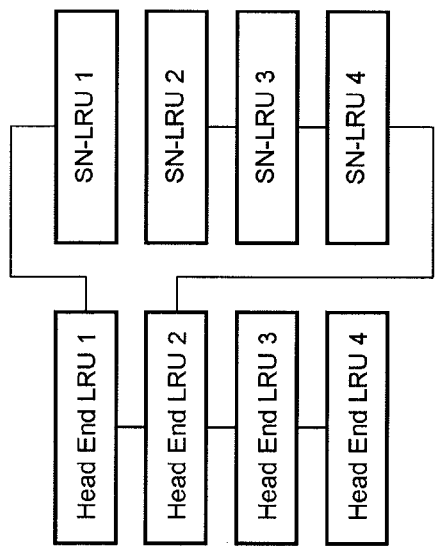

FIGS. 6A through 6D illustrate serial networking data path maintenance in some embodiments of the invention. FIG. 6A shows physical wiring of an IFE system having a ring of four HE-LRUs and a single chain of four SN-LRUs physically wired to HE-LRU 1 and HE-LRU 2. SN-LRUs keep apprised of the nearest HE-LRU through topology messaging and regulate link participation in serial networking data paths to establish and maintain loop-free data paths that minimize the maximum number of network hops of any SN-LRU to an HE-LRU. FIG. 6B shows the serial networking topology when there are no faults in the chain. The link between SN-LRU 2 and SN-LRU 3 has been removed from the data path, resulting in establishment of two loop-free data paths wherein the maximum number of hops to an HE-LRU is two. FIG. 6C shows the serial networking topology after reconfiguration upon detecting that the link between SN-LRU 1 and SN-LRU 2 has failed. This reconfiguration is made by adding the link between SN-LRU 2 and SN-LRU 3 to the data path to provide all SN-LRUs a least hop data path to an HE-LRU LRU wherein the maximum number of hops to an HE-LRU is three. FIG. 6D shows the serial networking topology after reconfiguration upon detecting that SN-LRU 4 has failed. This reconfiguration is made by adding the link between SN-LRU 2 and SN-LRU 3 to the data path to provide all SN-LRUs that remain active a least hop data path to an HE-LRU wherein the maximum number of hops to an HE-LRU is three. The additions and subtractions of links illustrated in FIGS. 6B through 6D are made under control of the network management processor in SN-LRU 1, SN-LRU 2 and/or SN-LRU 3 using hop count and/or presence information gleaned from topology messaging. For example, each SN-LRU may under control of its network management processor determine whether it is a middle SN-LRU of a chain by comparing the hop counts received on both of its ports. If the hop counts for both ports is the same or differ by only one hop, the SN-LRU self-identifies as a middle LRU; otherwise, the SN-LRU does not self-identify as a middle LRU. If the SN-LRU self-identifies as a middle LRU, the SN-LRU breaks the chain to create a loop-free network topology. If the hop counts for both ports differ by one hop, the SN-LRU under control of its network management processor blocks the port with the higher hop count (i.e. the port that has a longer path to the nearest HE-LRU) and unblocks the other port. If the hop count for both ports is identical, the SN-LRU under control of its network management processor blocks a predetermined one of the ports and unblocks the other port.

Figure 7A:
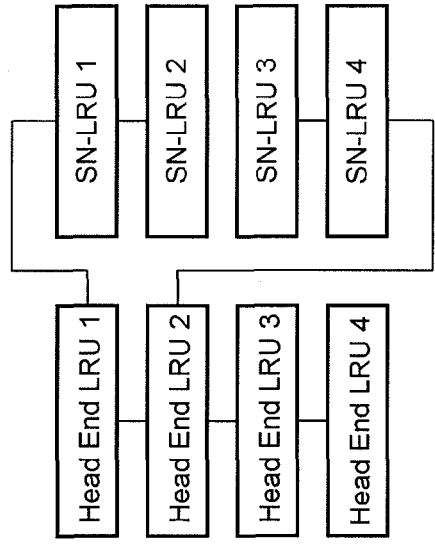
FIGS. 7A through 7D show head end data path maintenance in accordance with some embodiments of the invention.
Figure 7B:
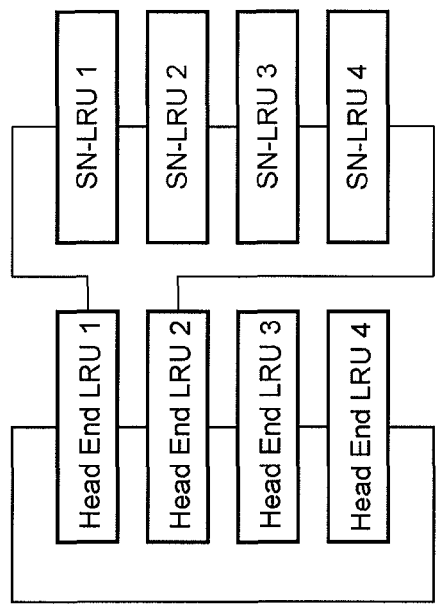
Figure 7C:
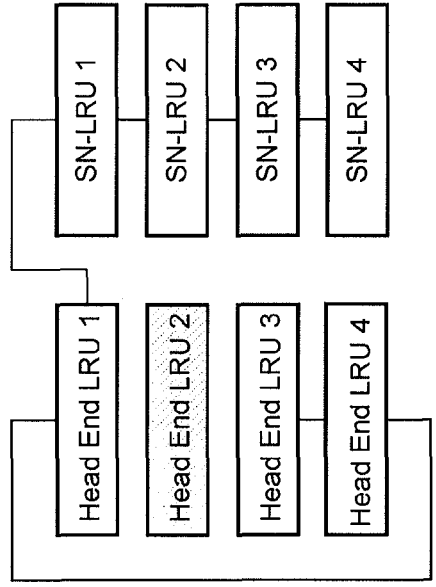
Figure 7D:
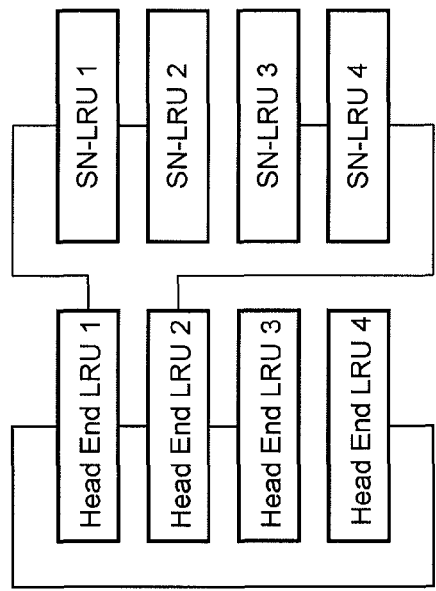

FIGS. 7A through 7D illustrate head end data path maintenance in some embodiments of the invention. FIG. 7A shows physical wiring of an IFE system having a ring of four HE-LRUs and a single chain of four SN-LRUs physically wired to HE-LRU 1 and HE-LRU 2. When HE-LRUs detect a closed HE-LRU ring as a result of topology messaging, a designated HE-LRU removes one of its links from the data path to create loop-free data path between HE-LRUs, which link may later be restored to the data path to maintain the data path if an HE-LRU or a link fails. FIG. 7B shows the head end network topology after HE-LRU loop detection. In that topology, the link between HE-LRU 1 and HE-LRU 4 has been removed from the data path to eliminate the loop. FIG. 7C shows the head end network topology after reconfiguration upon detecting that the link between HE-LRU 3 and HE-LRU 4 has failed. This link between HE-LRU 1 and HE-LRU 4 has been restored to the data path to maintain network access to all HE-LRUs. FIG. 7D shows the head end network topology after reconfiguration upon detecting that HE-LRU 2 has failed. This reconfiguration similarly results in restoration of the link between HE-LRU 1 and HE-LRU 4 to the data path to maintain network access to all live HE-LRUs. The additions and subtractions of links illustrated in FIGS. 7B through 7D are made under control of the network management processor in HE-LRU 1, HE-LRU-3, and/or HE-LRU 4 using loop information gleaned from topology messaging. In some embodiments, at least two of the HE-LRUs in an HE-LRU ring are of a single hardware design configuration.

In some embodiments, links are added and removed from data paths by dynamically regulating the state of transceivers in HE-LRUs and SN-LRUs between a data forwarding state and a data blocking state under control of the network management processors. Naturally, transceivers and their associated ports and links will continue to carry presence messages and other management information even when they are not participating in a data path.

In one embodiment, an important distinguishing feature of the present invention from conventional spanning tree protocols is that in the present invention networks in which the loop-free data path between HE-LRUs passes through an SN-LRU are not formed.

It is to be understood that the word "serial" as used herein describes the way the devices described are networked together and does not refer to the type of communications or way that communications are sent over the network links.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

The following is claimed:

1. An inflight entertainment system comprising:
    a plurality of interconnected head end line replaceable units (HE-LRUs);
    a plurality of serially-connected networking line replaceable units (SN-LRUs) interconnected in a serial configuration by links, the plurality of SN-LRUs comprising a first edge unit at a first edge of the serial configuration and a second edge unit at a second edge of the serial configuration;
    the first edge unit being interconnected with a first of the HE-LRUs without an intervening area distribution box;
    the second edge unit being interconnected with a second of the HE-LRUs without an intervening area distribution box; and
    a network management system comprising a plurality of processors and configured to: determine a first grouping of the SN-LRUs and a second grouping of the SN-LRUs, wherein:
    the first grouping includes the first edge unit and the second grouping includes the second edge unit;
    the first grouping forms a first loop-free serially-connected networking data path in communication with the first HE-LRU; and
    the second grouping forms a second loop-free serially-connected networking data path in communication with the second HE-LRU; and regulate link participation in the first and second serially-connected networking data paths, thereby maintaining data communication between each of the SN-LRUs and one of the first and second HE-LRUs.

2. The system of claim 1, wherein the network management system is configured to maintain the data communication between each of the SN-LRUs and one of the first and second HE-LRUs by removing a link from the first loop-free serially-connected networking data path.

3. The system of claim 2, wherein the selected link is selected using hop count information.

4. The system of claim 3, wherein the selected link is selected to minimize the maximum number of hops between any of the SN-LRUs that are active and either of the first and second HE-LRUs.

5. The system of claim 1, wherein the network management system is configured to maintain the data communication between each of the SN-LRUs and one of the first and second HE-LRUs by adding a selected link to the first loop-free serially-connected networking data path in response to detecting a failure on the second loop-free serially-connected networking data path.

6. The system of claim 5, wherein the failure is a link failure.

7. The system of claim 5, wherein the failure is a line replaceable unit failure.

8. The system of claim 1, wherein the network management system is located in at least one of the SN-LRUs.

9. The system of claim 1, wherein the network management system is located in at least one of the HE-LRUs.

10. The system of claim 1, wherein the SN-LRUs each include a first port and a second port, each SN-LRU being configured to determine if it is a middle line replaceable unit by comparing hop counts received on the first and second ports.

11. The system of claim 10, wherein if the hop counts on first and second ports are equal or differ by one hop, then the SN-LRU identifies as a middle line replaceable unit.

12. The system of claim 11, wherein the network management system removes a link adjacent to the SN-LRU that identified as the middle line replaceable unit.

13. The system of claim 1, wherein the HE-LRUs are interconnected in a serial configuration.

14. The system of claim 1, wherein the plurality of SN-LRUs comprises at least one video display line replaceable unit.

15. The system of claim 1, wherein the plurality of SN-LRUs comprises at least one cabin management terminal line replaceable unit.

16. The system of claim 1, wherein the plurality of SN-LRUs comprises at least one data-loader line replaceable unit.

17. A method of maintaining a loop-free data path in an in-flight entertainment system having a chain of serially networked line replaceable units (SN-LRUs), a first edge SN-LRU of the chain being connected with a first head-end line replaceable unit (HE-LRU) and a second edge SN-LRU of the chain being connected with a second HE-LRU, the method comprising:

determining a first portion of the chain of SN-LRUs, the first portion of the chain comprising a first loop-free data path in communication with the first HE-LRU;

determining a second portion of the chain of SN-LRUs, the second portion of the chain comprising a second loop-free data path in communication with the second HE-LRU;

each of the SN-LRUs being in the first portion of the chain or the second portion of the chain, the first and second portions of the chain not overlapping;

removing a link that connects an SN-LRU of the first portion of the chain and an SN-LRU of the second portion of the chain;

detecting a failure event; and replacing, in response to the failure event, the link that connects the SN-LRU of the first portion of the chain and the SN-LRU of the second portion of the chain.

18. The method of claim 17, further comprising sending first data from the first HE-LRU to the first edge SN-LRU of the chain without sending the first data through an area distribution box, and sending second data from the second HE-LRU to the second edge SN-LRU of the chain without sending the second data through an area distribution box.

19. The method of claim 17, wherein detecting the failure event comprises detecting a failure of a link connecting adjacent SN-LRUs in the first portion of the chain.

20. The method of claim 17, wherein detecting the failure event comprises detecting a failure of one of the SN-LRUs in the first portion of the chain.

21. The method of claim 17, further comprising determining a topology of the chain of SN-LRUs.

22. The method of claim 21, wherein determining the topology comprises using a hop count.

* * * * *